Figure 1:
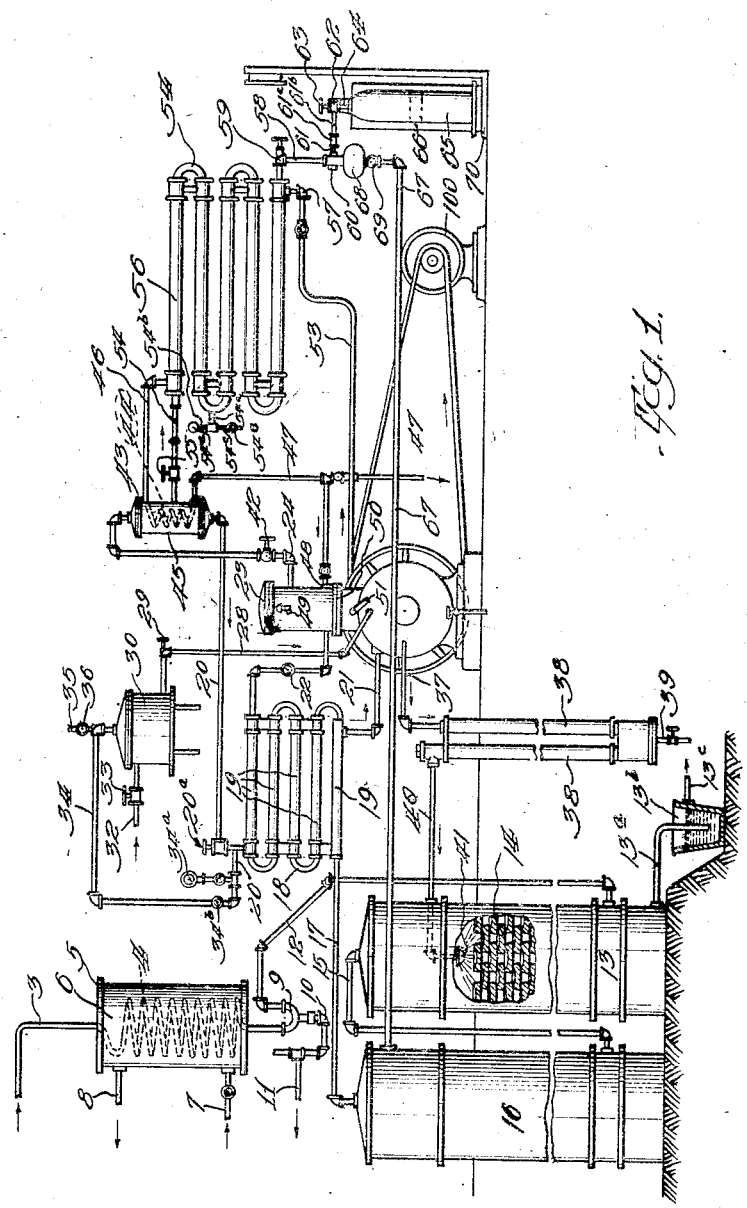

June 29, 1926.

W. M. JEWELL

APPARATUS FOR COMPRESSING GAS

Original Filed May 12, 1919   2 Sheets-Sheet 1

1,590,518

Witness:

Inventor:
William M. Jewell

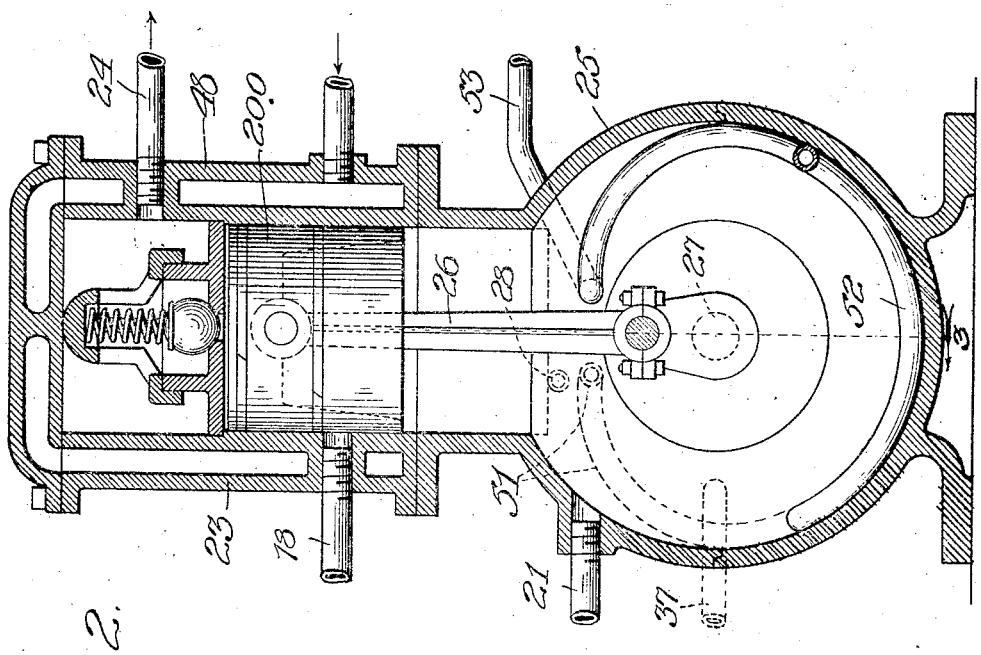
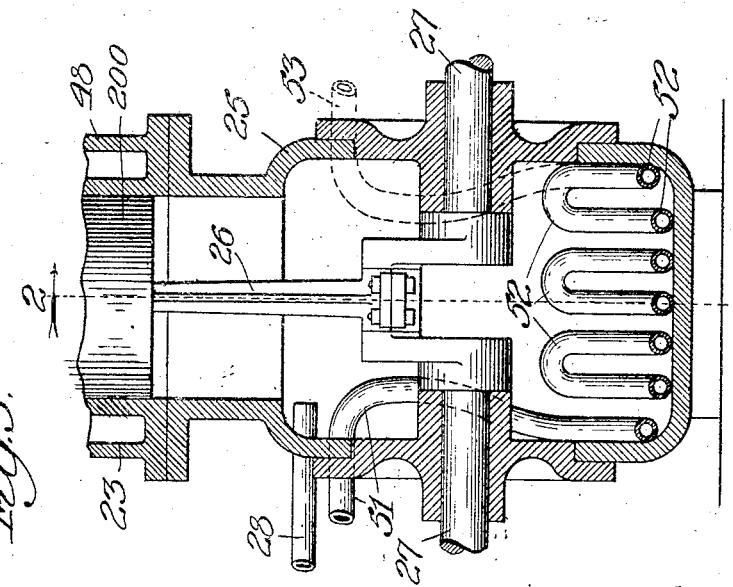

Patented June 29, 1926.

1,590,518

UNITED STATES PATENT OFFICE.

WILLIAM M. JEWELL, OF CHICAGO, ILLINOIS, ASSIGNOR TO CHLORINE PRODUCTS COMPANY, OF CHICAGO, ILLINOIS, A CORPORATION OF ILLINOIS.

APPARATUS FOR COMPRESSING GAS.

Original application filed May 12, 1919, Serial No. 296,460. Divided and this application filed February 11, 1921. Serial No. 444,188.

My invention relates generally to the compressing of gas, and more particularly to the manufacture of liquefied gas, especially chlorine gas; and my main objects, generally stated, are to provide improved apparatus for compressing gas, and more especially chlorine gas, in a compressor of the closed crank-case type, without drawing air into the crank-case and diluting the gas; and providing for the maintaining of the lubricant, especially where sulphuric acid is used, in relatively cool condition, my present invention having been divided out of my pending application for United States Letters Patent, Serial No. 296,460, filed May 12, 1919.

I have chosen to illustrate my invention, by way of example, in the accompanying drawings, in connection with the other details of the system disclosed in my said pending application wherein the system referred to is shown generally diagrammatical.

Referring to the accompanying drawings: Figure 1 shows by a view in the nature of a diagram, apparatus embodying my invention; Figure 2, is a view in vertical sectional elevation of a gas compressor employed, this section being taken at the line 2 on Fig. 3, and viewed in the direction of the arrows; and Figure 3, a broken section taken at the line 3 on Fig. 2, and viewed in the direction of the arrow.

In the particular system shown and adapted for liquefying chlorine gas more particularly, and described herein in such connection, a pipe, represented at 3, leads from the apparatus wherein the chlorine gas is produced, as, for example, from an electrolytic cell or cells (not shown) and which operate to produce electrolytic chlorine gas which commonly contains some non-condensable gas, this pipe connecting with the upper end of a coil 4 of a cooling apparatus 5, this coil being contained in a chamber 6 through which a cooling medium, as for example, water, is circulated, the water entering the bottom of the tank 5 through the pipe 7 and discharging therefrom at its top through the pipe 8. The lower end of the coil 4 connects with a trap 9 in the form of a U-pipe communicating at its lowest portion with a pipe 10 through which condensable matter removed from the chlorine gas in the coil 4, is withdrawn through the outlet pipe 11. The trap 9 connects with a pipe 12 which opens into the bottom of a preliminary drying tower 13 which may be of any suitable construction, the same being shown as of the loose-packing type, as represented at 14, whereby the gas flowing into the drying tower is caused to pass in a zigzag course to the upper portion thereof from which it passes through a pipe 15 which connects with the lower end of another drying tower 16 which may be of the same general construction as described for the tower 13, the gas passing upwardly through the tower 16 and passing therefrom through a pipe 17 which connects with a coil 18. The coil 18 as shown is jacketed by the coil 19 having an inlet pipe 20 and an outlet pipe 21, this part of the apparatus being so constructed that chlorine gas with acid therein, as hereinafter explained, will pass through the coil 19 in a direction contrary to the flow of gas through the coil 18. The end of the coil 18 opposite that connected with the pipe 17 is provided with a valve 22 and connects with the inlet opening of the compressor represented at 23, a pipe 24 communicating with the outlet opening in the cylinder of the compressor for the compressed gas. The compressor 23, as to its general features of construction, is of a common and well known reciprocating type, the crank case thereof being represented at 25 and in which the lower end of the connecting rod 26 of the compressor-piston operates, as shown in Fig. 2, the compressor shown being operated from the shaft 27, by any suitable power device (not shown). In the use of the compressor, its piston 200 is lubricated by means of comparatively dry sulphuric acid, the acid by preference being at least of 1.84 specific gravity at 66° Baumé 95% pure, and to accomplish this, the acid may be supplied to the interior of the crank case 25 from which it becomes supplied to the piston for lubricating the latter in its movements in the cylinder, by the action of the connecting rod 26 and its connection with the crank shaft 27 operating as a "splash" feed. In the particular apparatus shown, the sulphuric acid is supplied to the crank case 25 through a pipe 28, valved as indicated at 29, and connected with the lower end of a tank 30 communicating by a pipe 32, valved at 33, with a supply of sulphuric acid. The upper end of the tank 30 connects by a pipe 34 with the pipe 20, the pipe 34 adjacent the tank 30 having a branch 35 provided with a vent-valve 36 which is opened to permit the gas pressure in the chamber 30 to vent therefrom during the filling of this chamber with the acid. The crank case 25 contains an outlet about midway between its top and bottom for the sulphuric acid which connects with a pipe 37 opening into a trap 38 having a valved drain-pipe 39, the opposite end of this trap communicating with a pipe 40 which opens into the drying tower 13 and terminates above the packing 14 therein, in a spray-head 41 for spraying sulphuric acid against the rising currents of chlorine gas passing upwardly through the tower. The compressor-outlet pipe 24 contains a valve 42 and opens into the upper end of a tank 43 of a cooling apparatus 45 the coil of which, for the cooling medium, and which is located in the tank 43, being represented at 44. A pipe 46 for cooling water supplied thereto, as hereinafter described, connects with the upper end of the coil 44 for causing cooling water to flow through the latter from which it discharges through a pipe 47 into the jacketed portion of the cylinder 48 of the compressor, the outlet of this jacketed portion being represented at 49 and opening into a sewer.

A pipe 51 leading from a supply (not shown) of cooling water connects with the upper end of a coil 52 which lies in the bottom of the crank case 25, the outlet of this coil communicating with a pipe 53 which connects with a condenser hereinafter referred to.

The lower end of the tank 43 opens into the pipe 20 through which liquid chlorine with some of the sulphuric acid, passes for the purpose above stated.

The outlet of the tank 43 for this compressed chlorine gas connects with a pipe 54 valved, as indicated at 55, and formed into a coil as represented, this coil being surrounded by a coil 56 connected at its lower end with a valved water-inlet pipe 57 which connects with the pipe 53, the upper end of the coil 56 being connected with the pipe 46, the coils 54 and 56 forming a condenser in which the cooling water travels in a direction contrary to the flow of the gas. A pipe 54ª preferably connects with the pipe 54 and has branch pipes 54ᵇ and 54ᶜ, the pipe 54ᵇ being equipped with a gauge 54ᵈ and the pipe 54ᶜ which forms a vent-pipe, being equipped with a valve 54ᵉ. A pipe 58 valved at 59 leads from the coil 54 to a T-coupling 60 one outlet of which connects with a pipe 61 connected by a flexible pipe 61ª with a pipe 61ᵇ which terminates in a hollow head 62 with a valve 63, this head being connected with the inlet of a shipping container represented at 65, the container shown being such as are commonly used and holding about 100 pounds of liquid chlorine, the container being enclosed in heat-insulating material represented at 66 and shown as supported on a weighing scale 70. The other outlet of the T-coupling 60 connects with a pipe 67 having an enlargement 68 with a valve 69 below the enlargement, this pipe opening into the upper end of the drying tower 16 and terminating therein in a spray-head (not shown) for spraying sulphuric acid, separated in the chamber 68 from the liquid chlorine, into the chlorine gas as it passes upwardly through this tower.

In the operation of the apparatus as shown, the chlorine gas is drawn from the electrolytic cells hereinbefore referred to, by a slight vacuum preferably of about ⅛″ to ¼″ of water, produced by the action of the compressor and regulated by the valve 22, the gas with its contained water-vapor, which is present to a considerable degree and which should be removed, passing through the pipe 3 into the coil 4 wherein it is subjected to the cooling action of the water flowing into the latter through the pipe 7 and flowing out by the pipe 8, wherein the larger part of the water vapor in the gas is condensed and separated from the gas in the trap 9, the water thus separated flowing off through the outlet-pipe 11. The gas thus partially freed of its contained moisture then flows into the drying tower 13 wherein further drying is effected by the rising currents of the gas contacting the packing 14 which is wetted by the discharge of acid against it, the acid being supplied through the spray-head 41 from the pipe 40, trap 38, pipe 37 and crank case 25, the acid thus used being the acid which has passed through the compressor crank case 25 and has overflowed therefrom under the action of the continuous feed of acid into the crank-case from the tank 30, the acid flowing from the tower 13 through a pipe 13ª at its bottom and discharging into a receptacle 13ᵇ below its outlet 13ᶜ from which the spent acid flows to storage or waste. The gas then passes from the upper end of the drying tower 13 into the lower end of the drying tower 16 through which latter it upwardly passes in contact with the packing 14 wetted with a shower of sulphuric acid from the spray-head (not shown) but hereinbefore referred to and supplied with sulphuric acid from any suitable source, supplemented by sulphuric acid which passes into the pipe 67 from the separator-chamber 68, the moisture in the gas being reduced thereby to about 0.3 to 0.5 milligrams per liter, the final drying of the gas taking place in the tower 16. The gas then passes through the coil 18 where it is subjected to the cooling action of expanding chlorine gas which is supplied to the coil 19, to flow in a direction therethrough opposite to the flow of the gas through the coil 18, from the chamber 43 through the pipe 20. The gas in cooled condition then passes through the valved pipe 18 into the inlet of the compressor where it is compressed to about 100 pounds per square inch and in the compressing operation is commingled with sulphuric acid in finely divided condition and preferably partially vaporized, the acid being fed to the piston for lubricating it by the splash-feed action of the connecting rod 26 operating in the crank case 25 which contains sulphuric acid supplied thereto as stated. The compressed gas, together with some of the acid, commingled therewith as stated, discharges from the compressor through the valved pipe 24, and thence into the upper end of the tank 43 of the cooling apparatus 45, which operates as a trap, where it is subjected to the cooling action of the water which enters the coil 44 therein from the pipe 46 and discharges through the pipe 47 into the jacket of the compressor to prevent overheating of its cylinder 48. Condensing of a portion of the chlorine and sulphuric acid is effected in the tank 43. the acid, being heavier than the liquid chlorine, gravitating to the bottom of this tank and flowing with chlorine through the pipe 20 and coil 19 back to the crank case 25. The chlorine either as gas or liquid passes from the tank 43 through the pipe 54, which preferably is located a considerable distance from the bottom of the tank 43, into the condenser 54 which completes the condensing of the chlorine gas which passes over from the cooling tank 43, the chlorine in passing through the condenser 54 being subjected to the cooling action of the oppositely flowing currents of cold water in the coil 56. The condensed chlorine and any condensed sulphuric acid content, discharges into the pipe 58, the acid settling in the chamber 68 and the liquid chlorine entering the pipe 61 from which the chlorine, which is substantially 100% pure, may be filled into the shipping containers such, for example, as the one shown at 65.

The effect of operating on the chlorine as described is to produce in the condensing apparatus beyond the compressor, liquefied chlorine at a temperature of the coil 54 of approximately 70° F. and under relatively low pressure as stated, thus permitting the liquefied chlorine to be directly charged into the shipping containers. In the filling of the containers the air is exhausted therefrom before the filling operation begins, this exhausting operation being effected in any desired manner. The container is preferably first cooled to a point below the temperature of the condensed chlorine and then enclosed in the insulating covering 66 and thereupon the air exhausted from the container. The container is then connected with the pipe 61 and the liquid chlorine then permitted to flow into the container, this filling operation being quickly effected. The insulating of the container 65 serves to keep down the gas pressure in the coil 56 and this is further facilitated by permitting a portion of the liquid chlorine in the container 65 to evaporate by closing the valve 59 and opening valve 69. The gas thus liberated, together with the accumulations of acid in chamber 68, flows back through pipe 67 to the tower 16 and is thus not wasted. The temperature of the containers may thus be caused to be less than the temperature of the water in the condenser coil 56 so that no additional gas pressure is required for filling the containers. The feature of exhausting the air from the containers also presents the advantage of preventing the passage of air therefrom into the condenser and thereby producing objectionable results.

The effect of causing the compressed chlorine gas and sulphuric acid to become commingled is to render the compressed chlorine gas, condensable at such a relatively high temperature that the chlorine gas may, even though quite impure, and compressed only to the relatively low degree of substantially 100 pounds to the square inch, be condensed at relatively high temperature as for example 70° F., the temperature of ordinary water, with the manifest advantages, especially over prior practices involving the refrigeration of the compressed gas to temperatures at, or approximately at 35° F. below zero. While I prefer to employ sulphuric acid for the purpose stated, if desired, other substances condensable at higher temperatures than that at which pure chlorine under the same pressure condenses, may be used and the commingling of such substance and the gas, accomplished in any desired way, as also the commingling of the sulphuric acid and the gas may be effected in other ways than that described.

The feature of maintaining a pressure of chlorine gas in the crank case is of advantage as thereby the suction action produced by the operating parts of the compressor is not exerted on the surrounding atmosphere, but is neutralized by the pressure in the crank case and thus no air which would dilute the compressed gas, is permitted to enter the crank case: Also the feature of expanding chlorine into low-pressure gas in the coil 18 is of advantage as it aids in keeping cool the bearings of the compressor and reduces the final pressure required in the liquefying coil 54.

The water from waste 47 may, if desired, be used in the preliminary cooler 5 where temperature conditions permit; and the trap 38 is made sufficiently deep to more than counterbalance the gas pressure in the crank-case, so that no chlorine gas can get back into the tower 13.

When the container 65 has been filled the valves 59 and 62 are closed and valve 69 opened for a moment to relieve the gas in these connections.

The pipe 34, which is preferably equipped with a gauge $34^a$ and a valve $34^b$, operates to equalize the pressure in the top of the chamber 30 to effect free gravity flow of the acid therefrom.

The pipe 20 is preferably equipped with a valve $20^a$ by means of which the pressure of chlorine gas in the crank case may be regulated.

It will be understood that while certain particular steps and certain particular apparatus, are described and shown, I do not intend to limit the invention thereto as the same may be variously modified and altered without departing from the spirit of my invention. Furthermore, while I have described my invention as applied to chlorine gas manufacture, I do not wish to be understood as limiting it thereto.

What I claim as new, and desire to secure by Letters Patent, is:

1. In apparatus of the character set forth, the combination of a compressor of the closed crank-case type for compressing gas, containing an inlet for gas to be compressed, an outlet, and a second inlet, means for supplying to the crank-case of the compressor through said second inlet and during the operation of the compressor, the same kind of gas under a pressure not less than that of the atmosphere, and means for cooling the gas last referred to in its passage to the crank-case, whereby suction exerted in the crank-case is relieved by gas and the gas being compressed is undiluted by mixture with air.

2. In apparatus of the character set forth, the combination of a source of gas, a compressor of the closed crank-case type for compressing the gas from said source and containing an inlet in communication with said source, and an outlet for the compressed gas, means for supplying to the crank-case otherwise than through said inlet the same kind of gas under a pressure not less than that of the atmosphere, and means for cooling the gas last referred to in its passage to the crank-case, whereby suction exerted in the crank-case is relieved by such gas and the gas being compressed is undiluted by mixture with air.

3. In apparatus of the character set forth, the combination of a compressor of the closed crank-case type for compressing gas, the inlet for gas to be compressed being beyond said crank-case means for supplying to the crank-case the same kind of gas under a pressure not less than that of the atmosphere, and means for cooling the gas last referred to in its passage to the crank-case.

4. In apparatus of the character set forth, the combination of a compressor of the closed crank-case type for compressing gas and containing a suction inlet, an outlet for the compressed gas, a conduit leading from said outlet, a by-pass communicating with said conduit and said crank-case for supplying gas under a pressure not less than that of the atmosphere to said crank-case, and means for cooling the gas last referred to in its passage to the crank-case.

5. In apparatus of the character set forth, the combination of a compressor of the closed crank-case type for compressing gas, the inlet for gas to be compressed being beyond said crank-case, a by-pass for leading gas compressed by the compressor and of a pressure not less than that of the atmosphere back into the crank-case, and means for cooling the gas last referred to in its passage to the crank-case.

6. In apparatus of the character set forth, the combination of a source of gas, a compressor of the closed crank-case type for compressing the gas from said source and containing an inlet in communication with said source and an outlet for the compressed gas, and means for supplying to the crank-case otherwise than through said inlet the same kind of gas under a pressure of not less than that of the atmosphere and in its passage to the crank-case subjecting the gas from said source in the passage of the latter to said inlet, to a cooling action.

7. In apparatus of the character set forth, the combination of a source of gas, a compressor of the closed crank-case type for compressing the gas from said source and containing an inlet in communication with said source and an outlet for the compressed gas, and means for supplying to the crank-case otherwise than through said inlet, the same kind of gas under pressure, constructed and arranged to permit the gas to expand in its passage to the crank-case and cool the gas from said source in the passage of the latter to said inlet.

8. In apparatus of the character set forth, the combination of a compressor of the closed crank case type for compressing gas, said crank case containing sulphuric acid, a source of cooling water, and means, in communication with said source, for cooling the acid in the crank case by said cooling water.

9. In apparatus of the character set forth, the combination of a compressor of the closed crank case type for compressing gas, said crank case containing a lubricant, a source of cooling medium, other than said gas, and means in communication with said source for cooling the lubricant in the crank case by said cooling medium.

10. In apparatus of the character set forth, the combination of a compressor of the closed crank-case type for compressing chlorine gas, said crank-case containing sulphuric acid, a source of cooling medium other than said gas, and means in communication with said source for cooling the acid in the crank-case by said cooling medium.

11. In apparatus of the character set forth, the combination of a compressor of the closed crank-case type for compressing chlorine gas and adapted to employ sulphuric acid as a lubricant into contact with which the chlorine gas being compressed is brought, and means for cooling the crank-case of the compressor to maintain in relatively cooled condition the sulphuric acid in the crank-case.

12. In apparatus of the character set forth, the combination of a compressor of the closed crank-case type for compressing chlorine gas, said crank-case containing sulphuric acid, a source of cooling water, and means, in communication with said source, for cooling the acid in the crank-case by said cooling water.

13. In apparatus of the character set forth, the combination of a compressor of the closed crank-case type for compressing chlorine gas, said crank-case containing a lubricant, a source of cooling medium other than said gas, and means in communication with said source for cooling the lubricant in the crank-case by said cooling medium.

WILLIAM M. JEWELL.